United States Patent [19]

Kawahara

[11] Patent Number: 4,943,876
[45] Date of Patent: Jul. 24, 1990

[54] MAGNETIC HEAD POSITIONING APPARATUS FOR FLOPPY DISK DRIVE

[75] Inventor: Tutomu Kawahara, Fuji, Japan

[73] Assignee: Kabushiki Kaisha Toshiba, Kawasaki, Japan

[21] Appl. No.: 430,930

[22] Filed: Nov. 2, 1989

Related U.S. Application Data

[63] Continuation of Ser. No. 126,230, Nov. 27, 1987, abandoned.

[30] Foreign Application Priority Data

Nov. 29, 1986 [JP] Japan .................................. 61-284558

[51] Int. Cl.⁵ .............................................. G11B 5/55
[52] U.S. Cl. ................................... 360/106; 360/104
[58] Field of Search ............... 360/106, 104, 105, 109, 360/97.01, 98.01, 99.01; 74/89.15, 424.8 R

[56] References Cited

U.S. PATENT DOCUMENTS

| | | | |
|---|---|---|---|
| 4,322,762 | 3/1982 | Manzke | 310/13 |
| 4,427,905 | 1/1984 | Sutton | 310/13 |
| 4,528,607 | 7/1985 | Thompson | 360/106 |
| 4,630,145 | 12/1986 | Thompson et al. | 360/106 |
| 4,652,951 | 3/1987 | Kirn | 360/106 |
| 4,667,524 | 5/1987 | Kozawa et al. | 74/89.15 |
| 4,694,366 | 9/1987 | Fuke | 360/106 |

*Primary Examiner*—David J. Severin
*Attorney, Agent, or Firm*—Cushman, Darby & Cushman

[57] ABSTRACT

Disclosed therewith is a carriage apparatus for use in a floppy disk apparatus, in which a carriage mounted with magnetic heads and a lead screw are disposed such that a plane including the center of gravity of the carriage and the axis of the lead screw perpendicularly intersects a plane of a floppy disk.

3 Claims, 3 Drawing Sheets

MAGNETIC HEAD POSITIONING APPARATUS FOR FLOPPY DISK DRIVE

This is a continuation of Ser. No. 126,230, filed Nov. 27, 1987, now abandoned.

BACKGROUND OF THE INVENTION

The present invention relates to a carriage apparatus for use in a floppy disk apparatus, which is equipped with a magnetic head and executes the tracking of the head.

Generally, a floppy disk apparatus is designed such that a magnetic head performs a seek operation on a floppy disk to seek a desired track and accesses this track for data read/write operation. There is known a carriage apparatus which uses a lead screw to drive and position a carriage mounted with a magnetic head in order to execute the seek operation.

Conventional carriage apparatuses of this type comprise a carriage equipped with a magnetic head and a guide rail for guiding the carriage. The carriage is constituted by a carriage body of a nearly rectangular shape and a carriage arm disposed above the carriage body, between which a part of a floppy disk is adapted to be inserted. A magnetic head is provided at the distal end portion of each of the carriage body and carriage arm on the side facing the floppy disk. To move the magnetic head in the radial direction of the floppy disk, the guide rail is disposed so that its axis extends in that direction. The carriage is provided with a bearing by which the carriage is guided to the guide rail and supported there. The carriage apparatus further has a lead screw for driving the carriage, which is disposed in parallel to the guide rail and located in a position laterally spaced from the guide rail. The carriage has a side arm protruding from the lateral side thereof, through which the lead screw extends. The lead screw is engaged with a feed nut provided at a tip end portion of the side arm. The lead screw is linked to a stepping motor. With the rotation of the stepping motor, the carriage moves along the guide rail through the lead screw and the feed nut.

In conventional carriage apparatuses thus constituted, in case of tracking the magnetic head, the carriage-driving force, which is generated by the torque of the stepping motor and converted by the lead screw and the feed nut, acts on the carriage in the direction parallel to the guide rail at the position of the feed nut of the side arm. Since this line of action of the carriage-driving force does not pass through the center of gravity of the carriage, there occurs a moment of force about a line perpendicularly intersecting a plane including the line of action of the driving force, which extends nearly in parallel to a face of the floppy disk. Due to a gap between the guide rail and the bearing, the carriage is turned by this moment of force and is therefore moved in an inclined state. Particularly, because of the turning of the carriage in a plane parallel to the face of the floppy disk, the actual position of the magnetic head in the radial direction of the floppy disk is deviated from an intended position which is determined by the rotational angle of the stepping motor. In other words, when the magnetic head is moved outward in the radial direction of the floppy disk, the magnetic head is positioned inside by some distance from the intended position; on the other hand, when the magnetic head is moved in the opposite direction, it is positioned outside from the intended position. Consequently, the conventional floppy disk apparatuses would cause a tracking deviation in the seek operation of the magnetic head, thus causing an error in the read/write operation of the floppy disk apparatus.

SUMMARY OF THE INVENTION

With the above situation in mind, therefore, it is an object of this invention to provide a carriage apparatus capable of preventing positional deviation of the magnetic head in its seek operation so as to suppress the occurrence of an error in the read/write operation of the floppy disk apparatus.

In order to achieve the above object, a carriage apparatus according to this invention, which moves a magnetic head in the radial direction of a floppy disk, comprises a carriage equipped with said at least one magnetic head, a lead screw arranged such that an axis of said lead screw is located in a plane which includes a center of gravity of said carriage and substantially perpendicularly intersects a plane including said floppy disk, said lead screw guiding said carriage along said axis of said lead screw, drive means for rotating said lead screw around said axis thereof, conversion means for converting rotation of said lead screw into a linear motion of said carriage, and rotation preventing means for preventing said carriage from rotating around said axis of said lead screw.

BRIEF DESCRIPTION OF THE DRAWINGS

FIGS. 1 through 3 show a carriage apparatus according to a first embodiment of this invention, in which FIG. 1 is a schematic perspective view, FIG. 2 is a side view and FIG. 3 is a cross-sectional view as taken along line A—A of FIG. 2; and FIGS. 4 and 5 show a carriage apparatus according to a second embodiment of this invention, in which FIG. 4 is a plan view and FIG. 5 is a crosssectional view as taken along line B—B of FIG. 4.

DETAILED DESCRIPTION OF THE PREFERRED EMBODIMENTS

Figure 1:
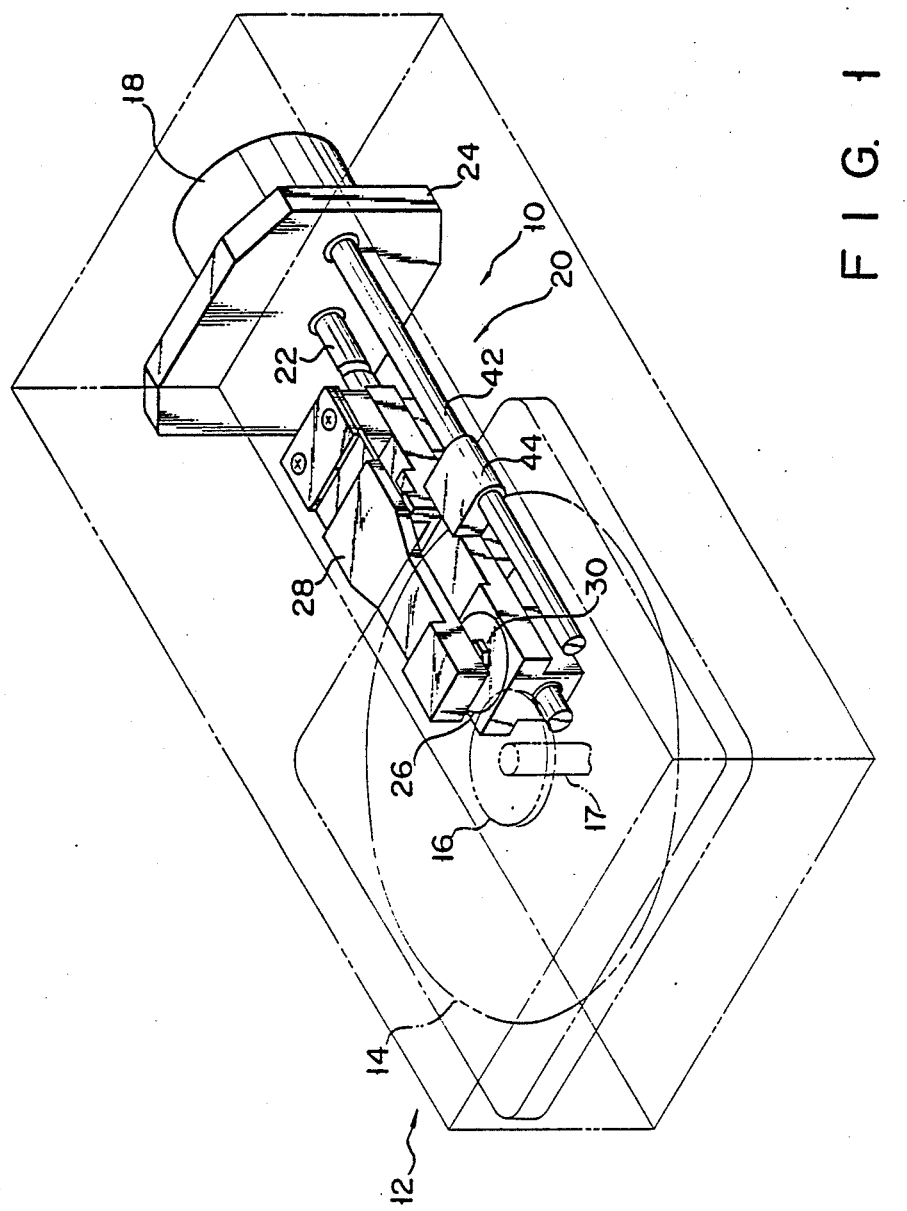
Figure 2:
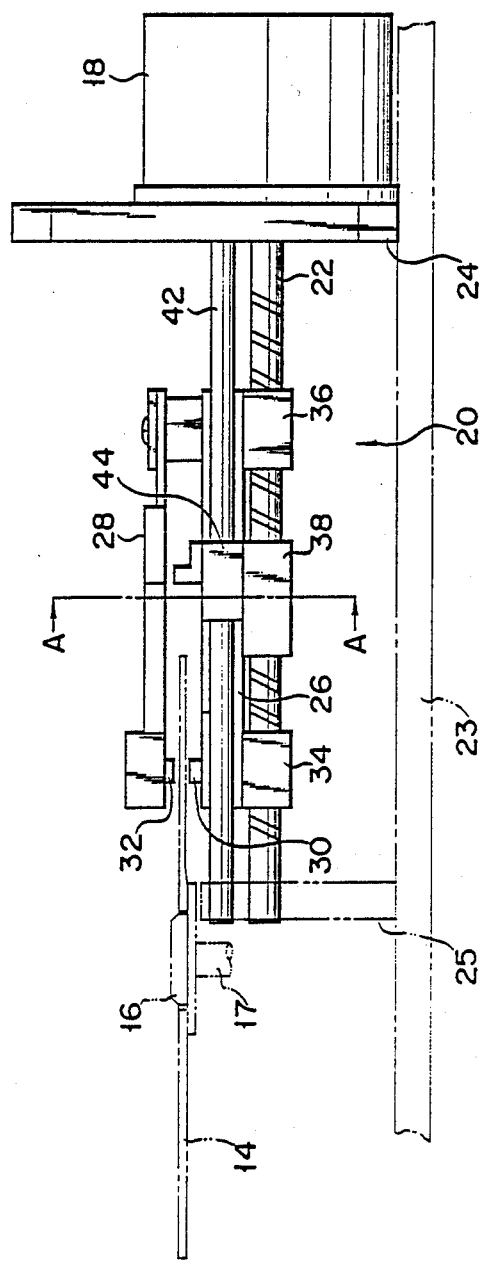
Figure 3:
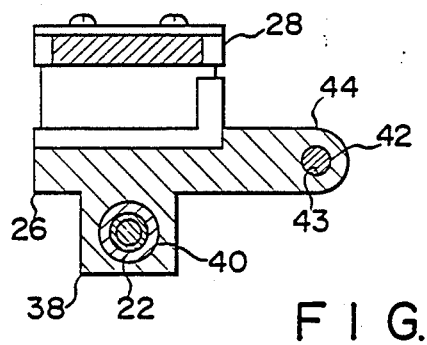

Referring now to FIGS. 1 to 3, a carriage apparatus according to the first embodiment of this invention will be explained. Carriage apparatus 10 is assembled in floppy disk apparatus 12 into which floppy disk 14 is loaded. This floppy disk 14 is supported by spindle hub 16 which is coupled to drive shaft 17 of a DC motor. Carriage apparatus 10 is disposed adjacent to floppy disk 14, and carriage-driving stepping motor 18 is disposed on that side of carriage apparatus 10 away from floppy disk 14.

As should be clear from FIGS. 1 and 2, carriage apparatus 10 has carriage 20 for magnetic head and lead screw 22 for driving and guiding the carriage. Lead screw 22 is a rotational shaft of stepping motor 18, on which a screw groove is provided. Lead screw 22 may be a screw coaxially linked to the rotational shaft of stepping motor 18. Stepping motor 18 is mounted on mounting plate 24, and an end portion of its rotational shaft, namely, an distal end portion of lead screw 22, is supported by mounting plate 25. These mounting plates 24 and 25 are fixed on base 23. Lead screw 22 is disposed such that its axis perpendicularly intersects the axis of drive shaft 17 or the rotational axis of floppy disk 14 and extends close to this drive shaft 17.

Carriage 20 has carriage body 26 of a nearly rectangular shape and carriage arm 28 disposed at some distance in parallel to this carriage body 26. Carriage body 26 and carriage arm 28 are coupled together at their base end portions, or their end portions away from floppy disk 14. Disk 14 is partially disposed in parallel between these two carriage components. Magnetic heads 30 and 32 are provided at respective distal end portions of carriage body 26 and carriage arm 28. The magnetic head 30 is disposed at the distal end portion of carriage body 26 on the top surface thereof facing floppy disk 14 and almost on the lengthwise center line of the carriage body. The magnetic head 32 is disposed on the distal end portion of carriage arm 28 so as to face magnetic head 30.

As illustrated in FIGS. 2 and 3, projections 34, 36 and 38 are provided at three sections of the bottom surface of carriage body 26, namely, both end portions and middle portion. A bearing is disposed at each end projection 34 or 36 and feed nut 40 is disposed at middle projection 38 in such a manner that the bearings and the feed nut are aligned coaxially along the center line of carriage body 26. The bearings and feed nut 40 are non-rotatably fit in their respective through holes provided in the individual projections 34, 36 and 38. If middle projection 38 and feed nut 40 are relatively long in their lengthwise directions, these projections 34 and 36 may not be necessary. Carriage 20 is movable along its axis, while being supported by lead screw 22 through the bearings or feed nut 40, which is engaged with lead screw 22. The top surface of carriage body 26 is parallel to the axis of lead screw 22 and the center line of carriage 20 is also parallel to the axis of lead screw 22. Consequently, magnetic heads 30 and 32 mounted on carriage 20 can move radially and in parallel to the surface of floppy disk 14. In carriage apparatus 10, the center of gravity of carriage 20 equipped with magnetic heads 30 and 32, the center lines or axes of carriage body 26 and carriage arm 28 and the axis of lead screw 22 are arranged substantially in the same plane.

In order to prevent carriage 20 from rotating about the axis of lead screw 22, carriage apparatus 10 has guide rail 42 disposed in parallel to lead screw 22 with a predetermined distance away therefrom. Guide rail 42 is a rod member having a length corresponding to lead screw 22 and is supported at its both ends on mounting plates 24 and 25. Carriage body 26 has guide arm 44 protruding from a lateral side thereof. Guide arm 44 is provided with through hole 43, through which guide rail 42 extends. Carriage 20 is guided to guide rail 42 via through hole 43 of guide arm 44.

The operation of this carriage apparatus 10 is as follows. To cause magnetic heads 30 and 32 to seek a target track on disk 14, stepping motor 18 is rotated by an angle corresponding to the amount of carriage movement. The rotation of stepping motor or the rotation of lead screw 22 is converted into a linear motion by rotation/linear motion conversion means, i.e., feed nut 40 engaged with lead screw 22. This linear motion is transmitted through projection 38 to carriage 20 which in turn moves along lead screw 22 by a distance corresponding to the rotation of stepping motor 18. Since carriage 20 is guided not only by lead screw 22 but also guide rail 42, carriage 20 does not rotate about the axis of lead screw 22 so that magnetic heads 30 and 32 can move radially onto the target track in parallel to the surface of floppy disk 14.

In this case, since the line of action of the driving force of feed nut 40 to carriage 20 does not pass through the center of gravity of carriage 20, the carriage receives a moment of force. This moment of force acts about a line, which passes through the center of gravity of carriage 20 and perpendicularly intersects a plane including the center of gravity of the carriage and the line of action of the driving force for carriage 20. As carriage 20 is guided by lead screw 22 and supplementally by guide rail 42, the moment is cancelled out by feed nut 44 or the bearings for the screw. Due to a gap between lead screw 22 and feed nut 44 or the bearings, carriage 20 slightly turns. In carriage apparatus 10, however, due to the action of the aforementioned moment of force, carriage 20 does not turn in the plane in parallel to the surface of floppy disk 14, but in the plane including the center of gravity of the carriage and the axis of lead screw 22. In addition, the distance between the point of action of the carriage-driving force and the axis passing between the bearings guiding the carriage is short. According to this carriage apparatus, therefore, the deviation in the radial direction of the floppy disk between the intended position of the magnetic heads and the actual head position can be set very small. This ensures the proper seek operation of the magnetic heads onto the target track, thus suppressing the occurrence of an error in the read/write operation of the floppy disk apparatus.

Figure 4:
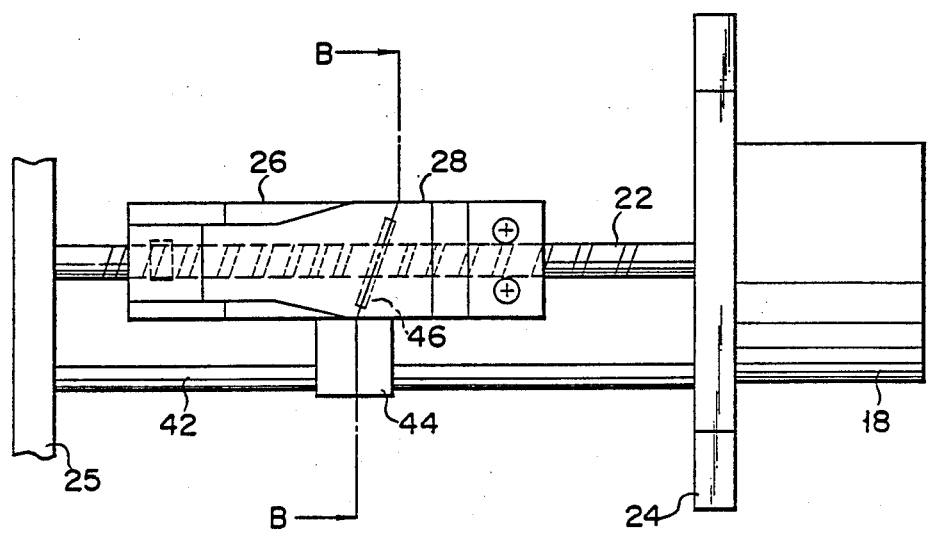
Figure 5:
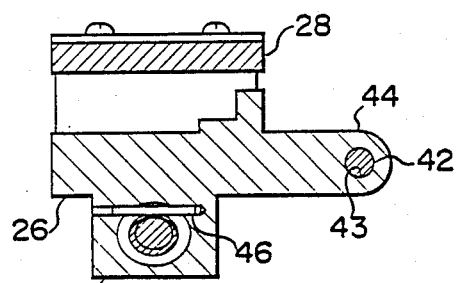

FIGS. 4 and 5 illustrate a carriage apparatus 10 according to the second embodiment of this invention. In this embodiment projection 38 is provided with a needle member 46 which is engaged with the groove formed in lead screw 22. The needle member 46 serving as a rotation/linear-motion converting means converts the rotation of lead screw 22 into a linear motion and transmits it to carriage 20 through projections 38.

In these two embodiments, the magnetic heads lie on the center line of carriage 20 and lead screw 22 has its axis perpendicularly intersecting the rotational axis of the floppy disk. This invention is not limited to this arrangement; for instance, lead screw 22 needs only to be disposed such that the plane including the axis of screw 22 and the center of gravity of carriage 20 is parallel to the rotational axis of floppy disk 14. In this case, the magnetic heads are located at a position deviated from the center line of carriage 20 in accordance with the distance between the above plane and the rotational axis of floppy disk 14.

What is claimed is:

1. A magnetic head positioning apparatus for floppy disk drives for moving a first magnetic head along a destination track of a floppy disk which is supported and rotated by a drive shaft, said first magnetic head being moved in a radial direction of the floppy disk, and said drive shaft extending from a base of the floppy disk drive coaxial with an axis of rotation of the floppy disk, said apparatus comprising:

a carriage including a carriage body which has a central axis extending in parallel to a surface of the floppy disk, and a carriage arm opposed to the carriage body and having a central axis, said first magnetic head being fixed to the carriage body;

a lead screw engaging the carriage and having an axis parallel to the central axis of the carriage body, said axis of the lead screw being located in a plane which includes the central axis of the carriage body, the central axis of the carriage arm, and a center of gravity of the carriage, and which perpendicularly intersects a plane including the surface of the floppy disk, said lead screw having a first end portion located between the base and the floppy disk and close to the drive shaft, and a second end portion located outside of a periphery of the floppy disk;

drive means for rotating the lead screw around the lead screw axis;

conversion means for converting rotation of the lead screw into a linear motion of the carriage along the lead screw axis; and rotation preventing means for preventing the carriage from rotating around the lead screw axis.

2. The apparatus according to claim 1, wherein said lead screw extends in the radial direction.

3. The apparatus according to claim 2, wherein said carriage body includes a plurality of projections arranged along the central axis thereof, and said lead screw engages the projections.

* * * * *